United States Patent

[11] 3,538,998

| [72] | Inventor | Harold A. Willett |
| | | Thibodaux, Louisiana |
| [21] | Appl. No. | 815,587 |
| [22] | Filed | April 14, 1969 |
| [45] | Patented | Nov. 10, 1970 |
| [73] | Assignee | Cane Machinery & Engineering Company, Inc. |
| | | Thibodaux, Louisiana |
| | | a corporation of Louisiana |

[54] SUGAR CANE PILER
4 Claims, 7 Drawing Figs.

[52] U.S. Cl. .................................................. 198/160, 56/16
[51] Int. Cl. ....................................................B65g 15/00, A01d 45/02
[50] Field of Search......................................... 56/15, 16, 17, 192; 198/160, 113, 114, 87, 8

[56] References Cited
UNITED STATES PATENTS

| 2,669,829 | 2/1954 | Pugh | 56/192 |
| 2,812,867 | 11/1957 | Anderson | 198/87 |
| 3,090,183 | 5/1963 | Thompson | 56/17 |

*Primary Examiner*—Richard E. Aegerter
*Attorney*—Wilkinson, Mawhinney & Theibault

ABSTRACT: This invention relates to a gateable piler for a sugar cane harvester which does not employ arches between the sticker chain conveyor and the adjacent pressure bar and which piler is foldable into compact sections when not in use. The piler is capable of being used for three-row heap rows by gating controls to permit cane discharge at three points at the rear of the harvester.

Patented Nov. 10, 1970

INVENTOR.
HAROLD A. WILLETT
BY
Wilkinson, Mawhinney & Theibault
ATTORNEYS

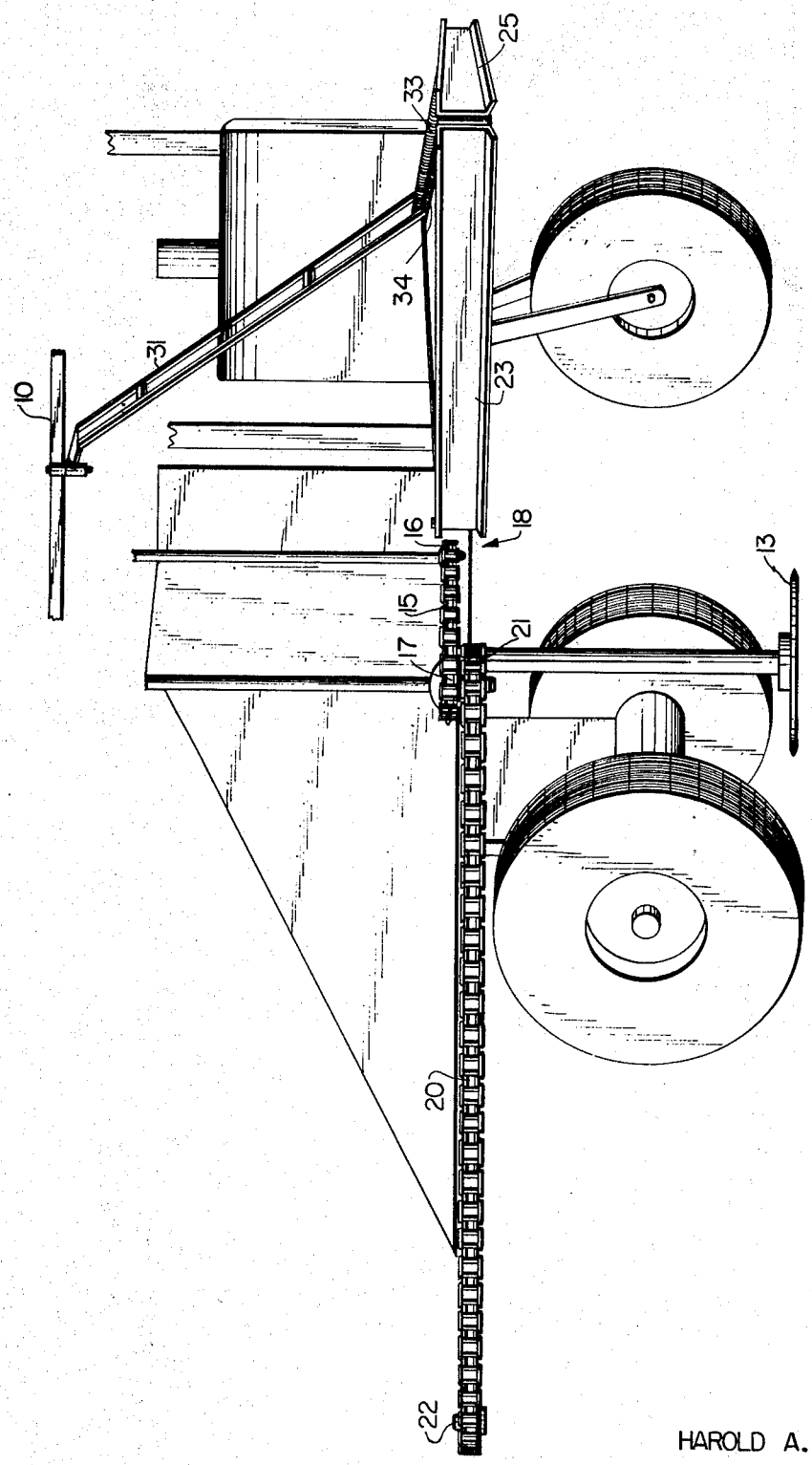

Patented Nov. 10, 1970

INVENTOR.
HAROLD A. WILLETT
BY
ATTORNEYS

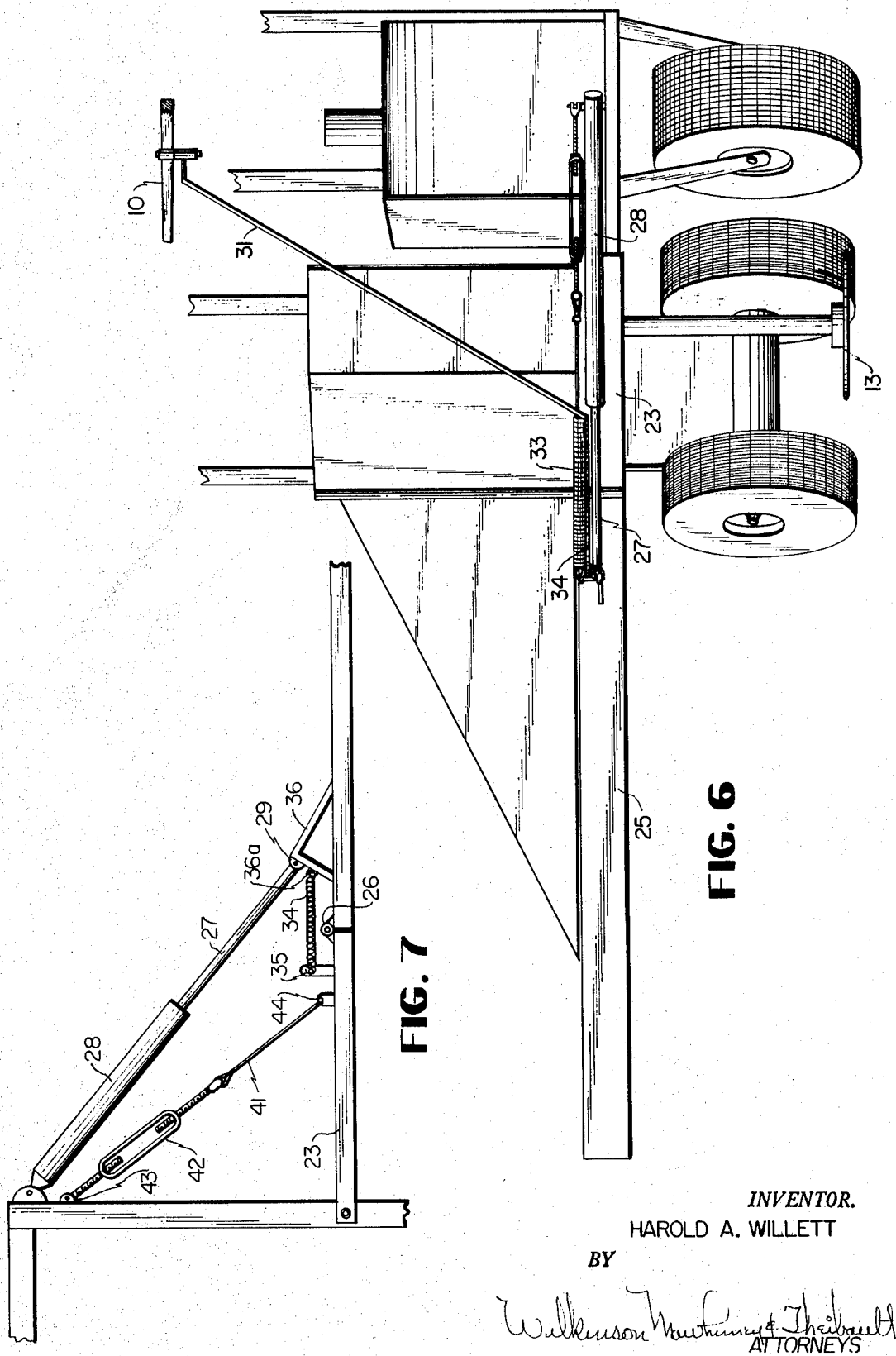

SUGAR CANE PILER

An object of the present invention is to provide an improved cane piler capable of being attached to a sugarcane harvester to receive cane cut by the harvester and to pile three rows on one, the method being generally that shown in U.S. Pats. to Thomson No. 2,427,313 and Pugh No. 2,669,829; however, the present piler eliminates the arches felt necessary for so many years and permits a simpler more compact construction.

A further object of the present invention is to provide a piler fully hydraulically operated which may be stored in a compact condition without increasing the transverse width of the harvester making it a greater danger to the highway transport to and from the harvesting areas.

A still further object of the present invention is the provision of a new piler for use with a three-wheeled harvester where the two heavy traction and motive wheels are on the front of the harvester and the third or steering wheel is located on the rear in alignment with one of the front wheels. The piler of the present invention discharges cane laterally of the harvester to one side thereof and intermediate the two front wheels and single rear wheel.

FIG. 4 is a three-quarter perspective view of the piler mounted on a three-wheeled harvester in position to discharge the first row.

FIG. 6 is a view similar to FIG. 5 with the second gate of the piler closed for discharging the third row of cane onto the heap row.

FIG. 7 is a fragmentary top plan view taken at an enlarged scale of the first and second pressure plate means employed with the piler of the present invention.

Figure 3:
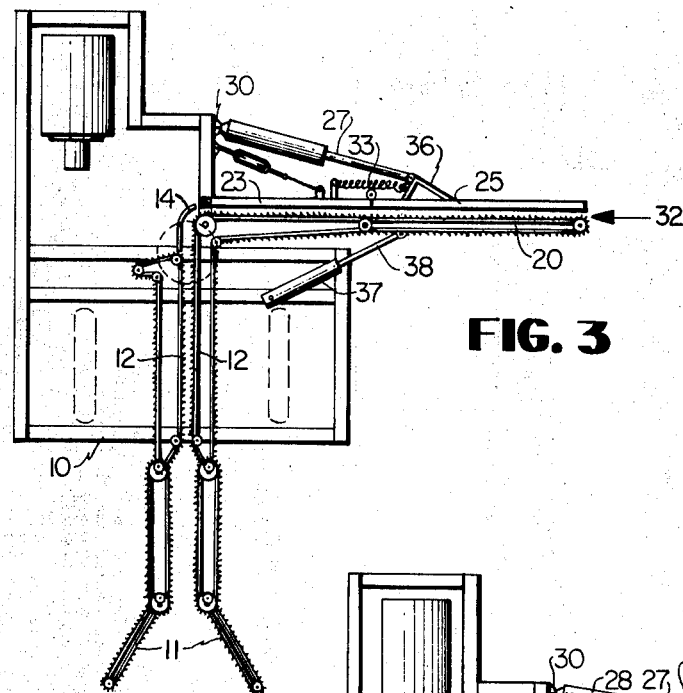
FIGS. 1 through 3 are mechanical schematics of the piler of the present invention in its three operating positions.
Figure 2:
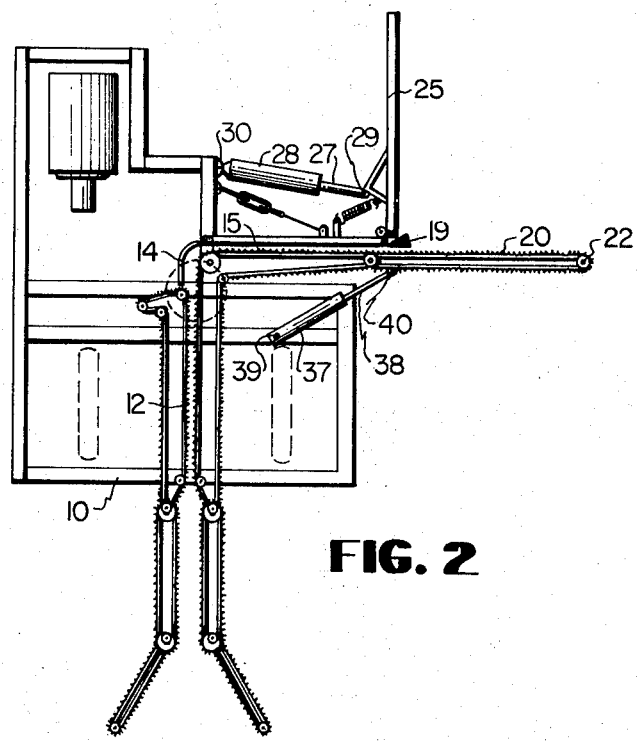
Figure 1:
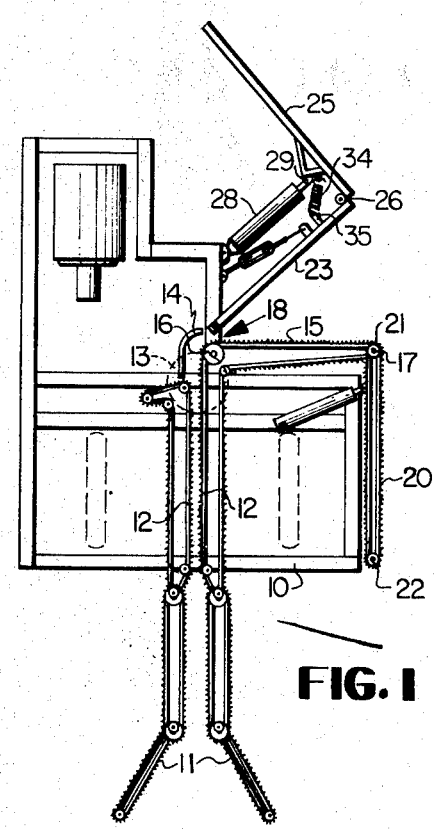

Referring now to the drawings and for the moment to FIGS. 1 through 3 inclusive, 10 designates a harvester having the conventional front gathering chains 11, longitudinal conveyor chains 12 and an earth cutter 13 for severing the standing can stalks from the earth. A deflecter bar 14 guides the cane to the first gate 18 where the cane is discharged onto the first row which will form the ultimate three-row heap. The first sticker chain conveyor 15 extends between sprockets 16 and 17 and is for moving cane from the first gate 18 to the second gate 19 as will be more fully explained hereinafter. The second sticker chain conveyor 20 is pivoted about the axis of the outer sprocket 17 and is foldable back against the harvester frame, as shown in FIG. 1, when not in use. This sticker chain conveyor 20 likewise has sprockets 21 and 22 over which it passes and the ultimate free end of the second sticker chain conveyor 20 forms the third gate 21 of the piler for depositing the third cut row of sugarcane upon the heap row.

Adjacent to but spaced from the first conveyor sticker chain 15 is a first pressure plate 21 which is pivoted to the harvester frame at 24. This plate is mounted to be pivoted about its vertical axis and to be swung from the position shown in FIG. 1 to the position of FIG. 2 where it cooperates with the sticker chain 15 to form a piler pressure plate and sticker chain unit. At the outer free end of the first pressure plate 23 is a second pressure plate 25 which is pivotally connected at 26 to the first pressure plate. As shown in FIG. 2 this pressure plate 25 is still retained in the open position to permit cane to be discharged from the second gate 19 onto the heap row.

Now as shown in FIGS. 2 and 3 the second pressure plate means 25 which is pivoted to the first pressure plate means 23 has also connected thereto a ram 27 actuated by cylinder 28. A pivotal connection 29 connects the ram to the pressure plate 25 while the cylinder is pivotally connected at 30 to a harvester frame pivotal connection 31. As shown in FIG. 3, when the ram 27 is extended by pressurizing the cylinder 28 the plate 25 is closed to form a pressure plate and a sticker chain cooperating piler section to form the third gate 32, at which point the sugarcane stalks from the third row are then piled onto the common heap row started by the piling of row one thereon. Also cooperating with the pressure plate 25 and harvester connection 31 are a pair of springs 33 and 34 one of each of which is connected to the harvester frame connection 31 at 35 and the other end of each of which is secured to the second pressure plate member 25 at 36 which is at a point outwardly toward the gate 32 from the pivot point 26 between pressure plate 25 and pressure plate 23.

The second sticker chain conveyor 20 is moved from the stored position of FIG. 1 to the extended position of FIG. 2 by a cylinder 37 and ram 38. The cylinder 37 is pivotally connected to the harvester frame at 39 and the ram is connected to the second sticker chain conveyor member 20 at 40.

Figure 5:
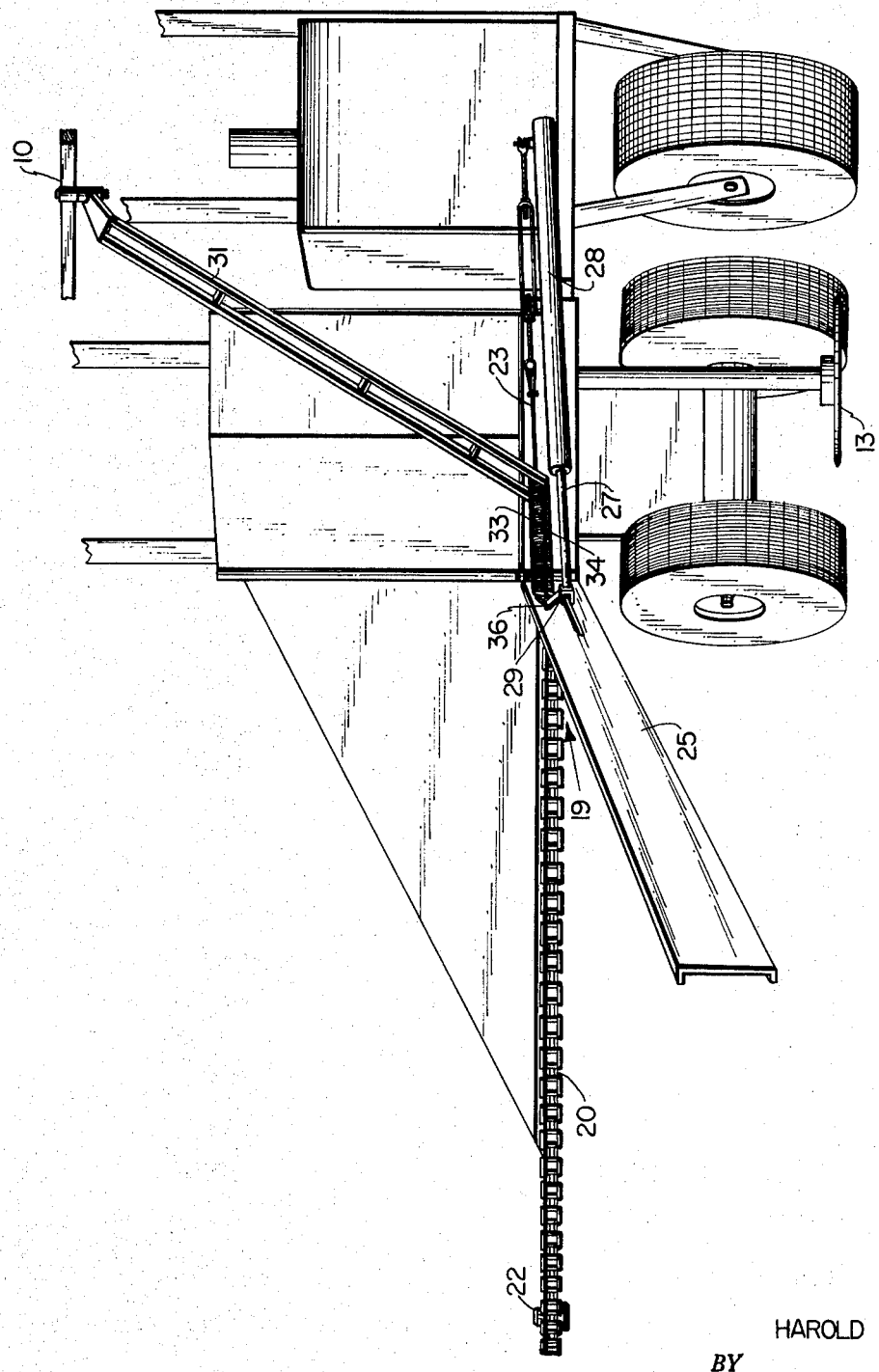
FIG. 5 is a rear elevational view of the piler of the present invention on a harvester with the first gate closed to discharge the second row of cane onto the heap row.

The sticker chain units shown in FIGS. 4 and 5 are sticker chain similar to or identical with the sticker chain shown in the Thomson U.S. Pat. No. 2,427,313 and the Pugh U.S. Pat. No. 2,669,829.

The harvesters are conventional in that they are provided with a conventional hydraulic pump, sump and controlled system which will permit the operation of a number of cylinder and ram assemblies from the hydraulic power plant driven from the power takeoff of the engine.

When a harvester having the piler of the present invention installed thereon is taken into a cane field, it enters the field in the position shown in FIG. 1, so that the first row of the cane cut is dropped out of the gate 18 onto a heap row which is transverse between two adjacent cane rows and upon making the second pass the first pressure plate means 23 is closed to the position shown in FIGS. 2 and 5 in such a manner that the sticker chain 15 forms a transfer relationship with the pressure plate 23 and upon the cutting of the cane of the second row, the cane stalks are advanced along the first conveyor section 15 and discharged there at the gate 19 onto the first cut heap row. Upon the cutting of the third row the pressure plate 25 is moved from the position of FIGS. 2 and 5 to the position of FIGS. 3 and 6 to form a full-length piler to transfer the third row cut onto the heap row defined by the transverse placement of the sugarcane stalks onto the first row.

The harvester connection 31 as shown in FIG. 4 is mounted on a portion of the harvester frame 10 for swivel or rotary movement so that it will move from the position shown in FIG. 1 to the position shown in FIGS. 2 and 3. The position shown in FIG. 4 is the position in which the unit is first employed with the second sticker chain unit 20 folded against the side of the harvester as shown in top plan in FIG. 1. The pressure plate 23 is in the open position. The sugarcane stalks then come through the harvester, are cut by the rotary cutter 13 and dropped through gate 18 where they pivot over and drop onto the ground in a manner well known in the art. When the second sticker chain conveyor unit 20 is rigged to its outer position shown in FIGS. 2 and 5, the cane stalks of the second row are then discharged through the gate 19 where they fall upon the first previously piled row on the heap. This unit 31 has then swung from the position in FIG. 4 to the position of FIG. 5. For the cutting of the third row, the cylinder and ram unit 27, 28 are in their maximum throw position where they have extended the springs 33, 34 to place considerable tension on the springs so that when the hydraulic fluid is bled off the cylinder 28, the toggle lock connection will be broken and the outer gate will then move back from the FIG. 6 position to the position shown in FIG. 5 and thence the unit can be retracted to the position of FIG. 4 to start the cutting and piling of another three-row heap.

As best seen in FIG. 7, the first pressure plate means 23 has the second pressure plate means 25 pivotally connected thereto at 26. The cylinder and ram 27 are connected to the second pressure plate means through a rigid bracket 36. The springs 33, 34, one end of each of which is secured to plate 23 and the other end of each of which is secured to the bracket 36, acts against the cylinder and ram 37. By this arrangement the piler closes for the second row before the last gate comes to a complete close. A flexible cable 41 is connected to plate 23 at one end and to a turnbuckle 42 at the other end. The turnbuckle 42 is pivoted to the harvester frame at 43. When the third row of cane is piled the pressure plates closed, as shown in FIG. 3, the springs 33, 34 are put in tension. To stop the gates or pressure plate means from wearing against the sticker chain, the turnbuckle cable unit is employed to limit the pressure of plate 23 against sticker chain 15.

I claim:

1. A sugarcane piler for use with a sugarcane harvester, comprising:
   a. a first sticker chain conveyor arm secured transversely of the harvester and positioned to receive cane stalks cut by the harvester;
   b. a second sticker chain conveyor arm pivoted to one side of the harvester and in registry with the discharge of said first sticker chain conveyor;
   c. means connected between the harvester frame and second sticker chain conveyor to move the second sticker chain conveyor from a flat against harvester stored position to an outwardly extending in alignment position with said first sticker chain conveyor;
   d. a first pressure plate means pivoted at one end to the harvester frame adjacent said first sticker chain conveyor and being movable toward and away therefrom;
   e. a second pressure plate means pivoted to the free end of said first pressure plate means and being movable toward and away from said second sticker chain conveyor when the latter is in the laterally extended position; and
   f. quick release means connected between the harvester frame and the second pressure plate means to restrict the second pressure plate from its adjacent cane-piling relationship with the second sticker chain conveyor.

2. A sugarcane piler as claimed in claim 1 wherein the means connected between the harvester frame and second sticker chain conveyor to move the second sticker chain conveyor to an outwardly extending position in alignment with the first sticker chain conveyor is a hydraulic cylinder and ram.

3. A sugarcane piler as claimed in claim 1 wherein said quick release means between the harvester frame and the second pressure plate means are a pair of coil springs one end of which is connected to a harvester frame mount and the other end of which is connected to the second pressure plate means outwardly of the pivotal connection between the first and second pressure plate means.

4. A sugarcane piler as claimed in claim 1 further comprising a hydraulic cylinder and ram connected between the harvester frame and the second pressure plate means outwardly of the pivotal connection between said first and second pressure plate means.